(12) United States Patent
Hayakawa et al.

(10) Patent No.: US 9,851,558 B2
(45) Date of Patent: Dec. 26, 2017

(54) LIGHT DEFLECTOR

(71) Applicant: BROTHER KOGYO KABUSHIKI KAISHA, Nagoya-shi, Aichi-ken (JP)

(72) Inventors: Kazuhiro Hayakawa, Nagoya (JP); Hidetaka Hoshino, Aichi (JP); Toshio Sakai, Nagoya (JP); Junji Fujitani, Nagoya (JP); Yasuomi Jibu, Ichinomiya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 40 days.

(21) Appl. No.: 14/722,261

(22) Filed: May 27, 2015

(65) Prior Publication Data
US 2015/0346485 A1 Dec. 3, 2015

(30) Foreign Application Priority Data

May 28, 2014 (JP) ................. 2014-109723

(51) Int. Cl.
*G02B 26/12* (2006.01)
*B41J 2/47* (2006.01)
*G02B 7/182* (2006.01)
*G03G 15/043* (2006.01)

(52) U.S. Cl.
CPC ........... *G02B 26/121* (2013.01); *B41J 2/471* (2013.01); *G02B 7/1821* (2013.01); *G03G 15/0435* (2013.01)

(58) Field of Classification Search
CPC .......... B60R 1/081; H04N 2201/04755; G02B 26/129

USPC ........ 359/200.1, 198.1, 200.7, 200.8, 201.2, 359/207.3, 216.1, 855; 347/257, 260, 347/267; 3/200.1, 198.1, 200.7, 200.8, 3/201.2, 207.3, 216.1, 855

See application file for complete search history.

(56) References Cited

U.S. PATENT DOCUMENTS

| 5,619,363 | A | * | 4/1997 | Hachisuga | ............... G02B 5/09 359/206.1 |
| 5,903,300 | A | * | 5/1999 | Suzuki | ................. G02B 26/121 347/261 |
| 6,201,624 | B1 | * | 3/2001 | Ozaki | .................. G02B 26/121 359/198.1 |

(Continued)

FOREIGN PATENT DOCUMENTS

| JP | 08-262361 | * 11/1996 | ............. G02B 26/10 |
| JP | 10-96872 A | 4/1998 | |

(Continued)

*Primary Examiner* — Stephone B Allen
*Assistant Examiner* — Travis Fissel
(74) *Attorney, Agent, or Firm* — Merchant & Gould P.C.

(57) ABSTRACT

A light deflector and an image forming apparatus including the light deflector are provided. The light deflector includes a polygon mirror made of plastic and a motor including a rotor. The rotor supports the polygon mirror and includes a base and a first protrusion protruding from the base toward the polygon mirror in an axial direction. The polygon mirror includes a main body having a plurality of reflecting surfaces, and a second protrusion protruding from the main body toward the base. The second protrusion has an end face and an inner face. The end face is in contact with the base in the axial direction, and the inner face is in contact with the first protrusion in a radial direction.

16 Claims, 7 Drawing Sheets

(56) References Cited

U.S. PATENT DOCUMENTS

| | | | | |
|---|---|---|---|---|
| 6,377,293 | B2* | 4/2002 | Koh | F16C 32/0431 |
| | | | | 347/243 |
| 8,619,108 | B2* | 12/2013 | Ishidate | B41J 2/471 |
| | | | | 347/242 |
| 2005/0018326 | A1* | 1/2005 | Yoon | G02B 26/121 |
| | | | | 359/877 |
| 2007/0273748 | A1* | 11/2007 | Mamiya | B41J 2/473 |
| | | | | 347/261 |
| 2008/0260312 | A1* | 10/2008 | Nishino | F16D 3/77 |
| | | | | 384/446 |
| 2010/0220374 | A1* | 9/2010 | Sumi | H02K 21/22 |
| | | | | 359/216.1 |
| 2011/0170154 | A1* | 7/2011 | Song | F16C 17/02 |
| | | | | 359/200.5 |
| 2011/0299146 | A1* | 12/2011 | Oh | H02K 1/30 |
| | | | | 359/200.1 |

FOREIGN PATENT DOCUMENTS

| | | |
|---|---|---|
| JP | 10-333075 A | 12/1998 |
| JP | 2011-186098 A | 9/2011 |

* cited by examiner

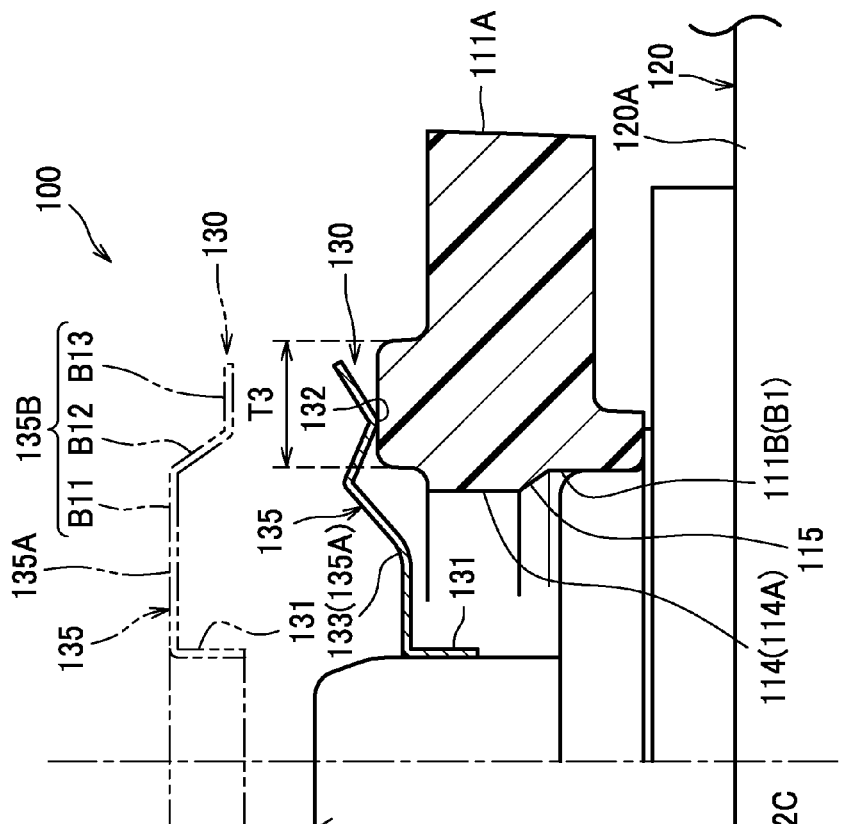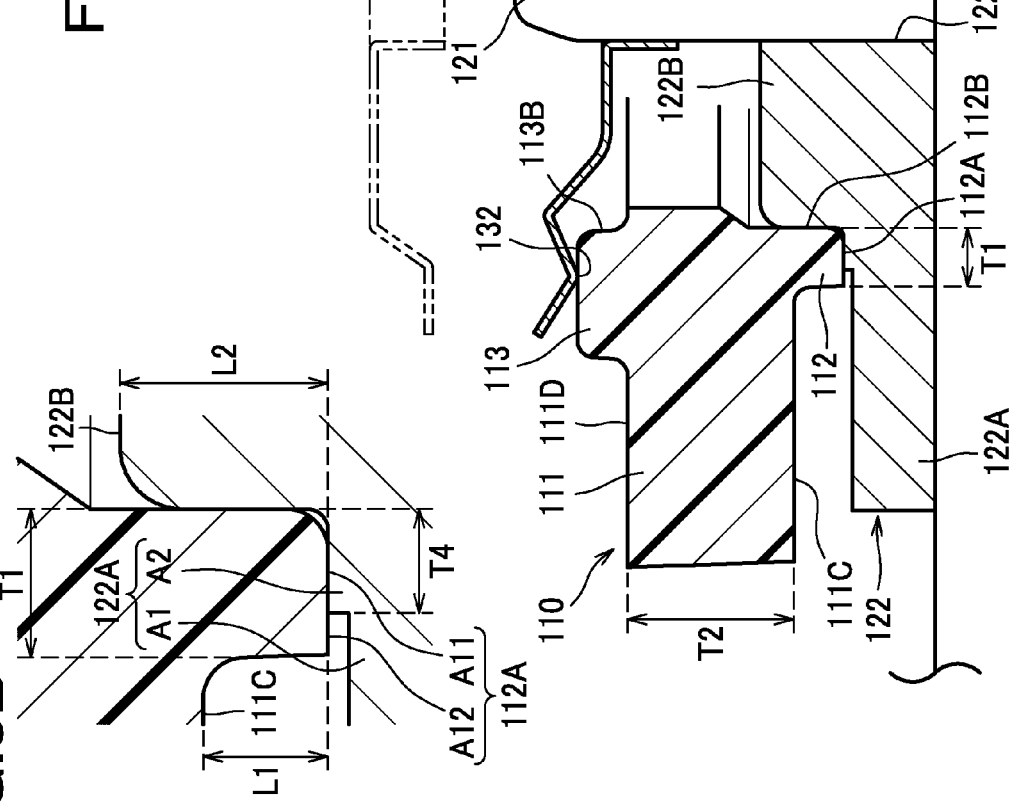

LIGHT DEFLECTOR

CROSS-REFERENCE TO RELATED APPLICATION(S)

This application claims priority from Japanese Patent Application No. 2014-109723 filed on May 28, 2014, the disclosure of which is incorporated herein by reference in its entirety.

TECHNICAL FIELD

Apparatuses disclosed herein relate to a light deflector including a polygon mirror made of plastic, and an image forming apparatus including such a light deflector.

BACKGROUND ART

A light deflector including a polygon mirror and a motor is known in the art. The motor typically includes a rotor that supports the polygon mirror. In one example of the light deflector, the polygon mirror has an underside that is in contact with the rotor when it is mounted to the rotor.

The polygon mirror made of plastic may be used for this purpose. In this application, heat generated in the motor may be transmitted through the rotor to the underside of the polygon mirror, and in turn transmitted from the underside to the reflecting surfaces of the polygon mirror, which would disadvantageously result in deformation of the reflecting surfaces by thermal expansion.

SUMMARY

In one aspect, a light deflector and an image forming apparatus are provided in which deformation of reflecting surfaces of a polygon mirror caused by thermal expansion due to heat from a rotor of a motor can be suppressed.

More specifically, a light deflector disclosed herein comprises a polygon mirror made of plastic and a motor including a rotor. The rotor of the motor supports the polygon mirror. The rotor includes a base and a first protrusion. The first protrusion of the rotor protrudes from the base toward the polygon mirror in an axial direction. The polygon mirror includes a main body having a plurality of reflecting surfaces, and a second protrusion protruding from the main body toward the base. The second protrusion has an end face and an inner face. The end face is in contact with the base in the axial direction, and the inner face is in contact with the first protrusion in a radial direction.

It is to be understood that, throughout this description, the terms "radial(ly)", "radial direction" and the like are used to refer to a direction perpendicular to a rotation axis of the motor; more specifically, "radially inner" and "radially outer" indicate locations (i.e., radial positions) closer to or farther from the rotation axis of the motor, respectively. Similarly, "radially inward(ly)" and "radially outward(ly)" may indicate directions toward and away from the rotation axis of the motor, respectively. The term "radial distance range" may be used to represent a range bounded by two circles each having the same radius (the same distance from the rotation axis of the motor). Also, the direction of the rotation axis (e.g., axis of rotation of a rotary shaft or "shaft") of the motor may be referred to as "axial direction".

BRIEF DESCRIPTION OF THE DRAWINGS

The above and other aspects, their advantages and further features will become more apparent by describing in detail illustrative, non-limiting embodiments thereof with reference to the accompanying drawings, in which:

FIG. 3A is a sectional view of a light deflector,
FIG. 3B is an enlarged view of a structure of the light deflector including a first protrusion of a rotor and a second protrusion of a polygon mirror.

DESCRIPTION OF EMBODIMENTS

Figure 1:
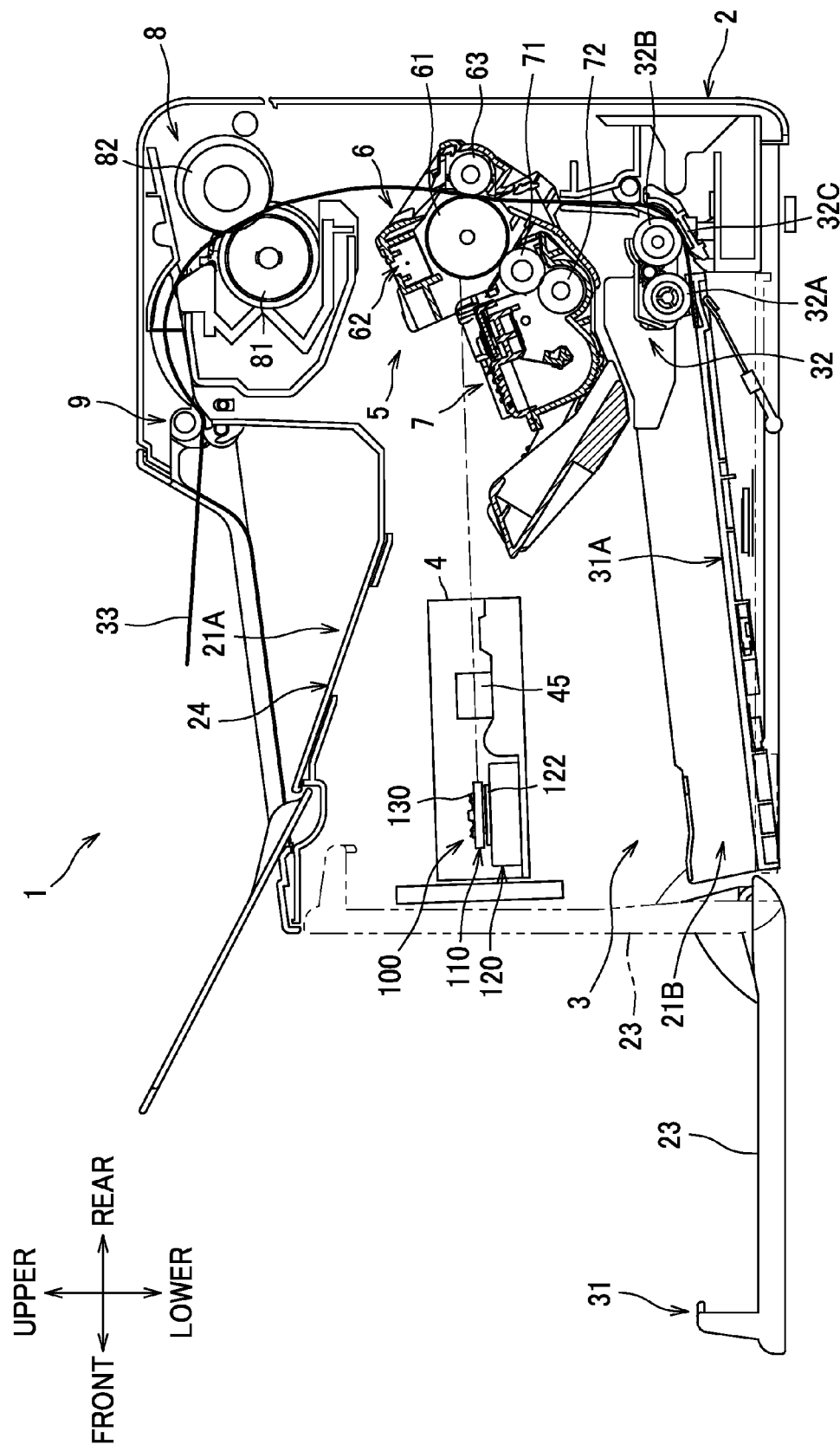
FIG. 1 is a sectional view of a laser printer.

A detailed description will be given of illustrative, non-limiting embodiments with reference made to the drawings where appropriate.

In the following description, the direction is designated as in FIG. 1; the left-hand side of the drawing sheet corresponds to the "front" side of the printer, the right-hand side of the drawing sheet corresponds to the "rear" side of the printer, the back side of the drawing sheet corresponds to the "left" side of the printer, and the front side of the drawing sheet corresponds to the "right" side of the printer. The upper/lower (top/bottom) sides of the drawing sheet corresponds to the "upper /under or top/bottom" sides of the printer, and the direction of a line extending upward and/or downward is referred to as "upward-downward direction".

As shown in FIG. 1, the laser printer 1 configured as one example of an image forming apparatus mainly includes a body casing 2, a feeder unit 3, a scanner 4, a process cartridge 5, and a fixing device 8.

The body casing 2 is provided with a front cover 23 rotatable relative to the body casing 2. This front cover 23 can be swung open to the front to open an insertion slot 21B, through which sheets 33 (e.g., of paper) can be inserted into the body casing 2.

The feeder unit 3 is located in a lower space inside the body casing 2, and includes a sheet feed tray 31 on which sheets 33 can be placed, and a sheet feed mechanism 32 configured to feed a sheet 33 on the sheet feed tray 31.

The sheet feed tray 31 is configured to include a rack 31A disposed in a lower space within the body casing 2, and the front cover 23 described above. The sheet feed mechanism 32 mainly includes a sheet feed roller 32A, a separation roller 32B, and a separation pad 32C.

In the feeder unit 3, sheets 33 placed on the sheet feed tray 31 are fed by the sheet feed roller 32A and separated one sheet from others between the separation roller 32B and the separation pad 32C, and conveyed toward the process cartridge 5.

The scanner 4 is provided in a front space within the body casing 2, and configured to emit and deflect a laser beam so that a photoconductor drum 61 that will be described later is scanned with the laser beam. A specific setup of the scanner 4 will be described later in detail.

The process cartridge 5 is located in a rear-side space (substantially at the center thereof) within the body casing 2, and provided above the sheet feed mechanism 32. The process cartridge 5 is configured to be removable from and installable in the body casing 2 through an opening 21A provided on an upper front side of the body casing 2. The opening 21A is configured to become available when the top cover 24 provided rotatably on the body casing 2 is swung open relative to the body casing 2. The process cartridge 5 includes a drum unit 6 and a development cartridge 7.

The drum unit 6 includes a photoconductor drum 61 as one example of a photoconductor, a charger 62, and a transfer roller 63. The development cartridge 7 includes a development roller 71 and a supply roller 72.

In the development cartridge 7, toner stored in a toner storage chamber is supplied to the development roller 71, and frictionally electrified, by the supply roller 72, and carried on the development roller 71. In the drum unit 6, a peripheral surface of the rotating photoconductor drum 61 is uniformly charged by the charger 62 and then exposed to a rapidly sweeping laser beam emitted from the scanner 4. In this way, an electrostatic latent image formulated based upon image data is formed on the peripheral surface of the photoconductor drum 61.

Subsequently, this electrostatic latent image is supplied with toner from the development cartridge 7, and a toner image is formed on the peripheral surface of the photoconductor drum 61. Thereafter, a sheet 33 is conveyed through between the photoconductor drum 61 and the transfer roller 63, so that the toner image carried on the peripheral surface of the photoconductor drum 61 is transferred onto the sheet 33.

The fixing device 8 is located in an upper rear-side space within the body casing 2, and disposed above the process cartridge 5. The fixing device 8 mainly includes a heating roller 61 and a pressure roller 82.

The fixing device 8 is configured to thermally fix toner transferred on the sheet 33 while the sheet 33 is forwarded through between the heating roller 81 and the pressure roller 82. The sheet 33 with toner thermally fixed thereon is conveyed to an ejection roller 9 disposed downstream of the fixing device 8, and ejected from this ejection roller 9 onto the top cover 24.

Figure 2:
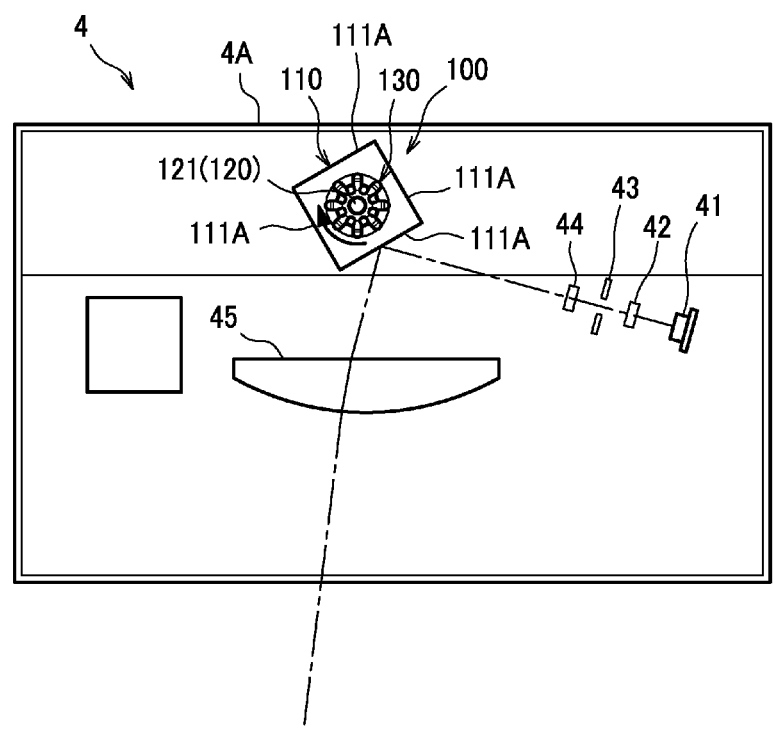
FIG. 2 is a plan view of a scanner.

As shown in FIGS. 1 and 2, the scanner 4 includes a semiconductor laser 41, a coupling lens 42, an aperture stop 43, a cylindrical lens 44, a light deflector 100, a scanning lens 45 and other components. The semiconductor laser 41 and the coupling lens 42 serve as a light source configured to emit a light flux. These elements are supported on a housing 4A. The laser beam emitted from the semiconductor laser 41 is, as indicated by alternate long and short dashed lines, directed to pass through the coupling lens 42, the aperture stop 43, the cylindrical lens 44, the light deflector 100, and the scanning lens 45 in this order, and focused on the peripheral surface of the photoconductor drum 61.

As shown in FIG. 2, the semiconductor laser 41 is a device configured to emit divergent laser light. Light-emitting elements in the semiconductor laser 41 are regulated (turned on and off) by a controller (not shown) to blink light in accordance with an image to be formed on the peripheral surface of the photoconductor drum 61.

The coupling lens 42 is a lens configured to convert a laser beam emitted from the semiconductor laser 41 into a light flux. The aperture stop 43 is a member having an opening that determines the diameter of the light flux coming from the coupling lens 42. The cylindrical lens 44 is a lens configured to converge the light flux coming through the coupling lens 2 and the aperture stop 3 in a sub scanning direction (direction orthogonal to the drawing sheet in FIG. 2) so that the light flux is focused into an image on a reflecting surface (one of four reflecting surfaces 111A) of a polygon mirror 110 that will be described later.

As shown in FIG. 1, the light deflector 100 includes a polygon mirror 110 configured to cause a laser beam coming through the cylindrical lens 44 to deflect in a main scanning direction, a motor 120 configured to rotate the polygon mirror 110, and a pressing member 130 for use in attaching the polygon mirror 110 to the motor 120. Details of the light deflector 100 will be described later.

As shown in FIG. 2, the scanning lens 45 is a lens configured to focus a light flux reflected and thus deflected by the polygon mirror 110 on the peripheral surface of the photoconductor drum 61. The scanning lens 45 has f-theta characteristics such that a light flux deflected at a constant angular velocity by the polygon mirror 100 is converted into a light flux with which the peripheral surface of the photoconductor drum 61 is scanned at a constant linear velocity.

Next, details of the light deflector 100 will be described below.

As shown in FIG. 3A, the motor 120 includes a driver 120A configured to produce a rotational force, a shaft 121, and a rotor 122 configured to coaxially rotate together with the shaft 121. The rotor 122 is a metal part that supports the polygon mirror 110, and includes a base 122A, and a first protrusion 122B protruding from a central portion of the base 122A upward (toward the polygon mirror 110; i.e., in an axial direction).

As shown in FIG. 3B, the base 122A includes a disc-shaped base body A1 and an annular projection A2 protruding from an upper surface of the base body A1 upward. The projection A2 is provided adjacent to a proximal end of the first protrusion 122B.

As shown in FIG. 3A, the first protrusion 122B is formed to have a cylindrical shape, and has a through hole 122C. The through hole 122C is formed in the center of the first protrusion 122B, and the shaft 121 is fitted in the through hole 122C.

The polygon mirror 110 is made of plastic (e.g., formed by injection molding using a plastic resin material), and attached to the rotor 122 of the motor 120. The polygon mirror 110 includes a main body 111, a second protrusion 112, and a third protrusion 113. The main body 111 has four reflecting surfaces 111A (see FIG. 2). The second protrusion 112 protrudes from the main body 111 downward (toward the rotor 122). The third protrusion 113 protrudes from the main body 111 upward (toward the pressing member 130).

The main body 111 has a shape of a quadrangular prism with substantially square bases. Four sides of the prismatic main body 111 on which reflecting films made of aluminum or the like are evaporated provide specular surfaces (reflecting surfaces 111A). The main body has, provided at its center, a through hole 111B piercing therethrough in an upward-downward direction (in the axial direction of the shaft 121).

The shaft 121 of the motor 120 is inserted in the through hole 111B from its lower side and protrudes beyond its upper side. The through hole 111B is defined by an inside surface B1 of the main body. The inside surface B1 that defines the through hole B1 is a cylindrical surface. The inside surface B1 is separate from the shaft 121 radially outwardly.

On the inside surface B1 that defines the through hole 111B, an annular rib 114 protruding from the inside surface B1 radially inwardly is formed integrally. On a lower side of the rib 114, a slope 115 gently connecting an inside surface 114A of the rib 114 and the inside surface B1 that defines the through hole 111B is formed integrally. To be more specific, the slope 115 has an inclined surface extending, obliquely with respect to the axial direction, from the inside surface 114A of the rib 114 to the inside surface B1 that defines the through hole Bl.

The second protrusion 112 has an annular shape contoured to follow a circle of which a center coincides with the axis of the shaft 121. The second protrusion 112 protrudes from a lower surface 111C of the main body 111, and thus is so located as not to overlap the reflecting surfaces 111A as viewed from radial directions. The second protrusion 112 has an end face 112A that is in contact with the projection A2 of the base 122A of the rotor 122 (see FIG. 3B) in the axial direction. Thus, the polygon mirror 110 is located in place in the upward-downward direction with respect to the rotor 122.

The second protrusion 112 has an inner face 112B that is in contact with the first protrusion 122B of the rotor 122 in the radial direction. To be more specific, the inner face 112B of the second protrusion 112 is formed to have an inside diameter slightly larger than an outside diameter of the cylindrical first protrusion 122B. Accordingly, the center (rotation axis) of the polygon mirror 110 is aligned with the center (rotation axis) of the shaft 121; thus, the polygon mirror 110 is located in place in the radial direction with respect to the rotor 122.

The second protrusion 112 is provided around (at the edge of) the through hole 111B. The second protrusion 112 is so formed that the inner face 112B thereof is flush with (i.e., located in the same position in the radial direction as) the inside surface B1 defining the through hole 111B. A thickness T1 of the second protrusion 112 in the radial direction is smaller than a thickness T2 of the main body 111 in the axial direction.

As shown in FIG. 3B, the thickness T1 of the second protrusion 112 is greater than a thickness T4 of the projection A2 in the radial direction. Accordingly, the end face 112A of the second protrusion 112 includes a contact region A11 that is in contact with projection A2 (base 122A), and a non-contact region A12 that is out of contact with the projection A2. To be more specific, a radially inner annular area of the end face 112A is the contact region A11, and a radially outer annular area of the end face 112A is the non-contact region A12.

A distance L1 from the lower surface 111C of the main body 111 to the end face 112A of the second protrusion 112 is shorter than a distance L2 from an upper end of the projection A2 (base 122A) to an upper surface (protruding end) of the first protrusion 122B.

As shown in FIG, 3A, the third protrusion 113 protrudes from an upper surface 111D of the main body 111. The third protrusion 113 has an annular shape contoured to follow a circle of which a center coincides with the axis of the shaft 121. To be more specific, the third protrusion 113 is provided around the through hole 111B. The third protrusion 113 has a radially inner side 113B. The third protrusion 113 is so formed that the radially inner side 113B thereof is located substantially in the same position in the radial direction as the inside surface B1 that defines the through hole 111B. A thickness T3 of the third protrusion 113 in the radial direction is greater than the thickness T1 of the second protrusion 112 in the radial direction, and smaller than the thickness T2 of the main body 111 in the axial direction. Accordingly, an area of the third protrusion 113 in contact with a pressing portion 132 can be increased, and the flowability of plastic resin materials in a mold during a molding process of the polygon mirror can be increased.

Figure 4:
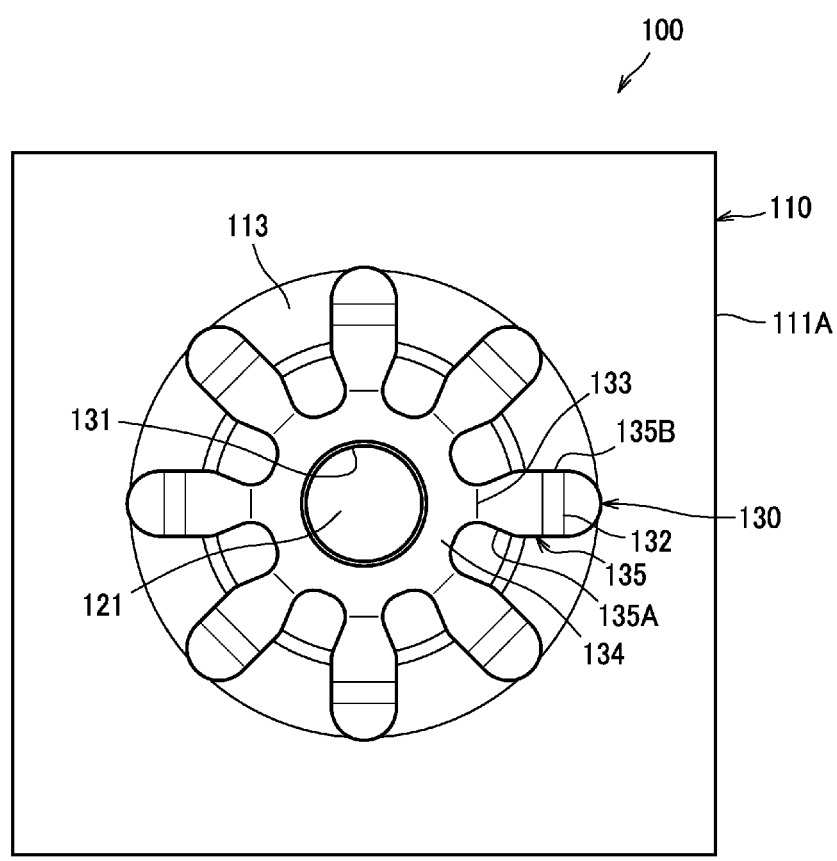
FIG. 4 is a plan view of the light deflector as viewed from above.

As shown in FIGS. 3A and 4, the pressing member 130 is a member having a springiness and configured to press the polygon mirror 110 against the rotor 122. The pressing member 130 includes an engaging portion 131 engaged with the shaft 121, pressing portions 132 in contact with the third protrusion 113 of the polygon mirror 110, and intermediate portions 133 provided between the engaging portion 131 and the pressing portions 132.

The engaging portion 131 has a cylindrical shape. The engaging portion 131 is fitted on the shaft 121, and configured to press the shaft 121 radially inwardly. When the pressing member 130 is attached to the shaft 121, the engaging portion 131 is located in a position lower than that in which the pressing portions 132 are located. In other words, the engaging portion 131 of the pressing member 130 attached to the shaft 121 is closer to the rotor 122 than the pressing portions 132 of the pressing member 130 are. At an upper end of the engaging portion 131, an annular flange portion 134 is provided. The annular flange portion 134 extends from the upper end of the engaging portion 131 radially outwardly.

At a peripheral edge of the annular flange portion 134, a plurality of arm portions 135 are provided. The arm portions 135 are arranged equidistantly in the circumferential direction. Each of the arm portions 135 extends from the peripheral edge of the annular flange portion 134 radially outwardly. Each arm portion 135 includes a constriction portion 135A and a distal end portion 135B. The constriction portion 135A is a portion that gradually becomes narrower from the peripheral edge of the annular flange portion 134, and from halfway gradually becomes wider, toward radially outward. The distal end portion 135B extends from an outer end of the constriction portion 135A radially outward without changing its width.

The narrowest portion of the constriction portion 135A is an intermediate portion 133. In other words, the intermediate portion 133 has a width narrower than that of the pressing portion 132. With this configuration, when the pressing member 130 is attached to the shaft 121, the arm portion 135 deforms mainly at this intermediate portion 133.

As shown in FIG. 3A, in which the pressing member 130 unstressed before attachment to the shaft 121 is represented by chain double-dashed lines, the distal end portion 135B includes a first portion B11, a second portion B12 and a third portion B13. The first portion B11 extends from an outer end of the constriction portion 135A radially outward. The second portion B12 extends from an outer end of the first portion B11 obliquely in a radially-outward-and-downward direction. The third portion B 13 extends from an outer end of the second portion B 12 radially outward. A portion of the pressing member 130 at an interface between the second portion B12 and the third portion B13 (i.e., bent portion) provides the pressing portion 132 that comes in contact with, and presses, an upper surface of the third protrusion 113 of the polygon mirror 110 when the pressing member 130 is attached to the shaft 121.

The pressing portion 132 is located within a radial distance range in which the second protrusion 112 is provided. In other words, the pressing portion 132 is located within the range of the thickness T1 of the second protrusion 112.

Advantages of the configuration described above are as follows:

Since the rotor 122 is in contact with the second protrusion 112 protruding from the main body 111 of the polygon mirror 110, a path of heat transfer from the rotor 122 to the reflecting surfaces 111A can be elongated, and thus transfer of heat produced in the driver 120A to the reflecting surfaces 111A can be retarded or reduced, so that thermal deformation of the reflecting surfaces 111A can be restricted.

Since the second protrusion 112 is annular, heat from the rotor 122 can be transferred uniformly to the second protrusion 112, so that deformation which would otherwise be effected unevenly among the reflecting surfaces 111A can be restricted.

Since the thickness T1 of the second protrusion 112 in the radial direction is smaller than the thickness T2 of the main body 111, the area of the end face 112A of the second protrusion 112 can be made smaller, in comparison with an alternative configuration in which the thickness of the second protrusion 112 and the thickness of the main body 111 are equal to each other. Accordingly, even if the projection A2 provided in the above-described configuration is not provided and the entire end face of the second protrusion 112 is in contact with the base 122A, the contact area between the end face of the second protrusion 112 and the base of the main body can be reduced, so that thermal deformation of the reflecting surfaces 111A can be suppressed effectively. It is to be appreciated that the thickness of the second protrusion 112 is typically designed to be equal to the thickness of the main body 111 in order to optimize the flowability of plastic resin materials in the mold during the molding process of the polygon mirror 110; however, the thickness of the second protrusion 112 determined on purpose is smaller than the thickness of the main body 111 with due consideration given to the aforementioned advantage in view of thermal deformation of the reflecting surfaces.

Since the end face 112A of the second protrusion 112 is configured to include the contact region A11 in contact with the base 122A and the non-contact region A12 out of contact with the base 122A, the contact area of the end face 112A of the second protrusion 112 in contact with the base 122A can be reduced, and thus thermal deformation of the reflecting surfaces 111A can be restricted effectively.

Since the main body 111 of the polygon mirror 110 has the through hole 111B piercing therethrough in the axial direction of the shaft 121, heat transmitted from the rotor 122 through the second protrusion 112 to the main body 111 can be dissipated from the inside surface B1 that defines the through hole 111B of the main body 111, so that the thermal deformation of the reflecting surfaces 111A can be restricted effectively.

Since the inside surface B1 that defines the through hole 111B is separate from the shaft 121 radially outwardly, that is, the inside surface B1 that defines the through hole 111B is not in contact with the shaft 121, the heat transfer from the shaft 121 to the main body 111 can be restricted.

Since the annular rib 114 is provided on the inside surface B1 that defines the through hole 111B, the main body 111 is reinforced by this rib 114, and thus the deformation of the reflecting surfaces 111A which would otherwise result from deformation of the main body 111 having the through hole 111B due to centrifugal force received during rotation of the polygon mirror 110 can be restricted.

Since the slope 115 connecting the inside surface 114A of the rib 114 and the inside surface B1 that defines the through hole 111B is provided in the polygon mirror 110, the sharp drop in level between the inside surface 114A of the rib 114 and the inside surface B1 that defines the through hole 111B can be smoothed out by filling the corner with material forming the slope 115, and thus, the flowability of plastic resin materials in the mold during the molding process of the polygon mirror 110 can be improved.

Since the pressing member 130 is used to press the main body 111 against the rotor 122, the polygon mirror can be appropriately located in place in the upward-downward direction with respect to the rotor 122.

Since the pressing portion 132 is located within a radial distance range in which the second protrusion 112 is provided, the deformation of the main body 111 which could be caused by the pressing force of the pressing member 130 can be restricted. It is to be understood that if the pressing portion 132 is located, for example, in a position radially shifted from that radial distance range in which the second protrusion 112 is provided, the main body 111 is liable to deformation by the pressing force of the pressing member 130, with the result that the reflecting surfaces 111A would possibly be caused to deform.

Since the engaging portion 131 is located in a position lower than that in which the pressing portion 132 is located, the upward protrusion of the pressing member 130 from the polygon mirror 110 can be reduced, and thus the size of the light deflector 100 in the upward-downward direction can be restricted.

Since the width of the intermediate portion 133 of the pressing member 130 is narrower than that of the pressing portion 132, the rigidity of the intermediate portion 133 can be made lower than that of the pressing portion 132, and a desired elastic force can be produced by the intermediate portion 133, so that the pressing force can be set to an appropriate value. Since the width of the pressing portion 132 is wider than that of the intermediate portion 133, the contact area of the pressing portion 132 with the polygon mirror 110 can be increased so as to prevent undesirable concentration of a load, and thus deformation of the reflecting surfaces 111A which would be caused by the force applied from the pressing portion 132 can be restricted.

Since the third protrusion 113 protruding from the main body 111 is pressed by the pressing member 130, deformation of the reflecting surfaces 111A which would be caused by the stress applied to the main body 111 can be restricted, in contrast, for example, to an alternative configuration in which the main body 111 is directly pressed by the pressing member 130.

Since the radially inner area of the end face 112A of the second protrusion 112 is utilized as the contact region A11 that is in contact with the base 122A, the contact region A11 can be distanced far away from the reflecting surfaces 111A that are located at the radially outer sides, and thus heat transfer from the base 122A to the reflecting surfaces 111A can be restricted effectively.

The outer peripheral edge of the end face 112A of the second protrusion 112 may be defined at a parting line of molds, and burrs that is likely to occur at such a parting line of the molds would possibly be left on the outer peripheral edge of the end face 112A after the molding process. However, since the radially outer area of the end face 112A is an area (non-contact region A12) that is out of contact with the base 122A, even if such burrs are left on the outer peripheral edge of the end face 112A, the polygon mirror 110 can be located in place in the upward-downward direction with stability without being affected by contact of the burrs with the base 122A It is to be understood that various modifications and changes may be made to the above-described specific embodiment as will be described below by way of example. In the following description, the same elements as those described above will be designated by the same reference numerals, and a duplicate description will be omitted.

Figure 5:
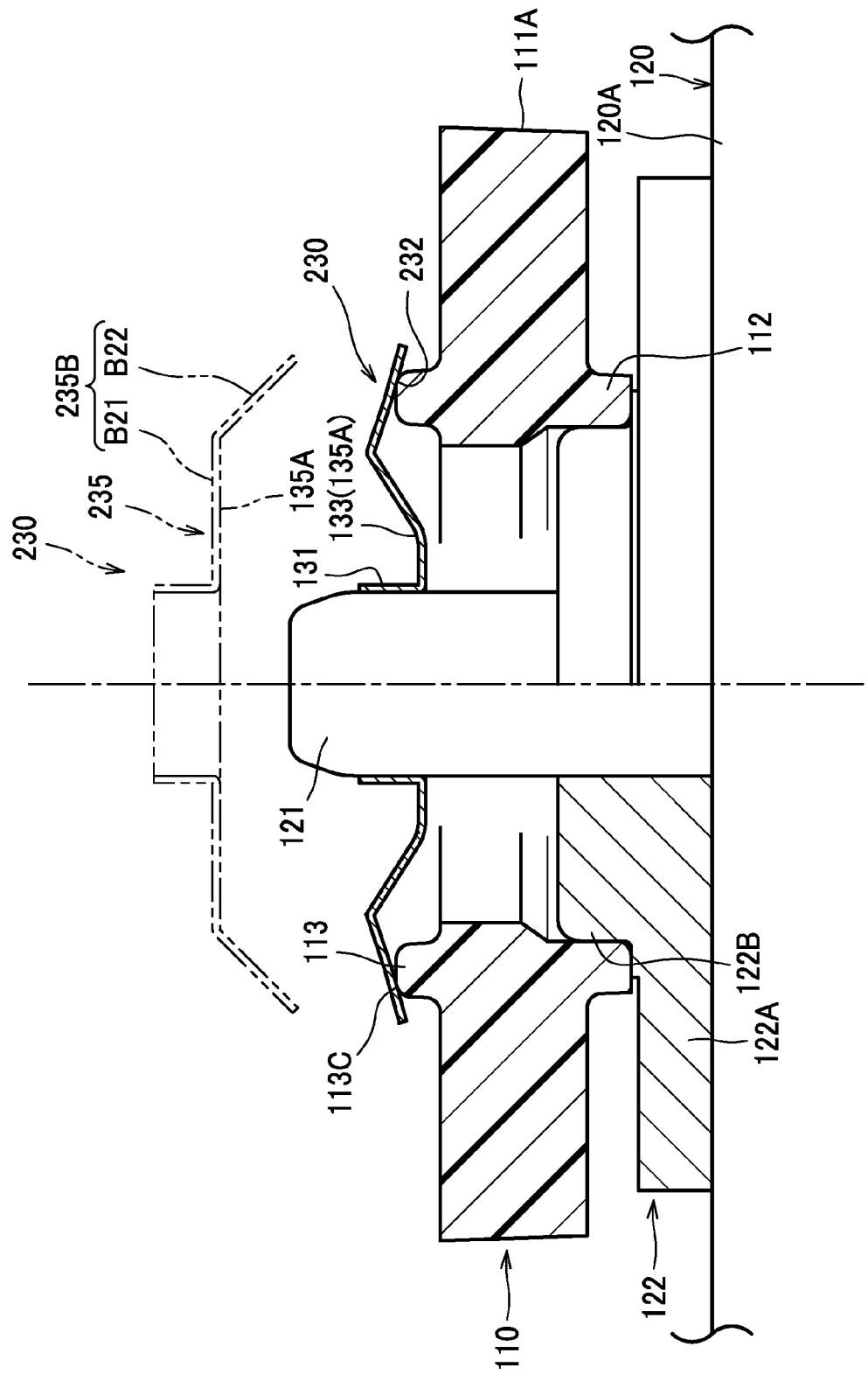
FIG. 5 is a sectional view of a light deflector according to a modified example 1.
Figure 6:
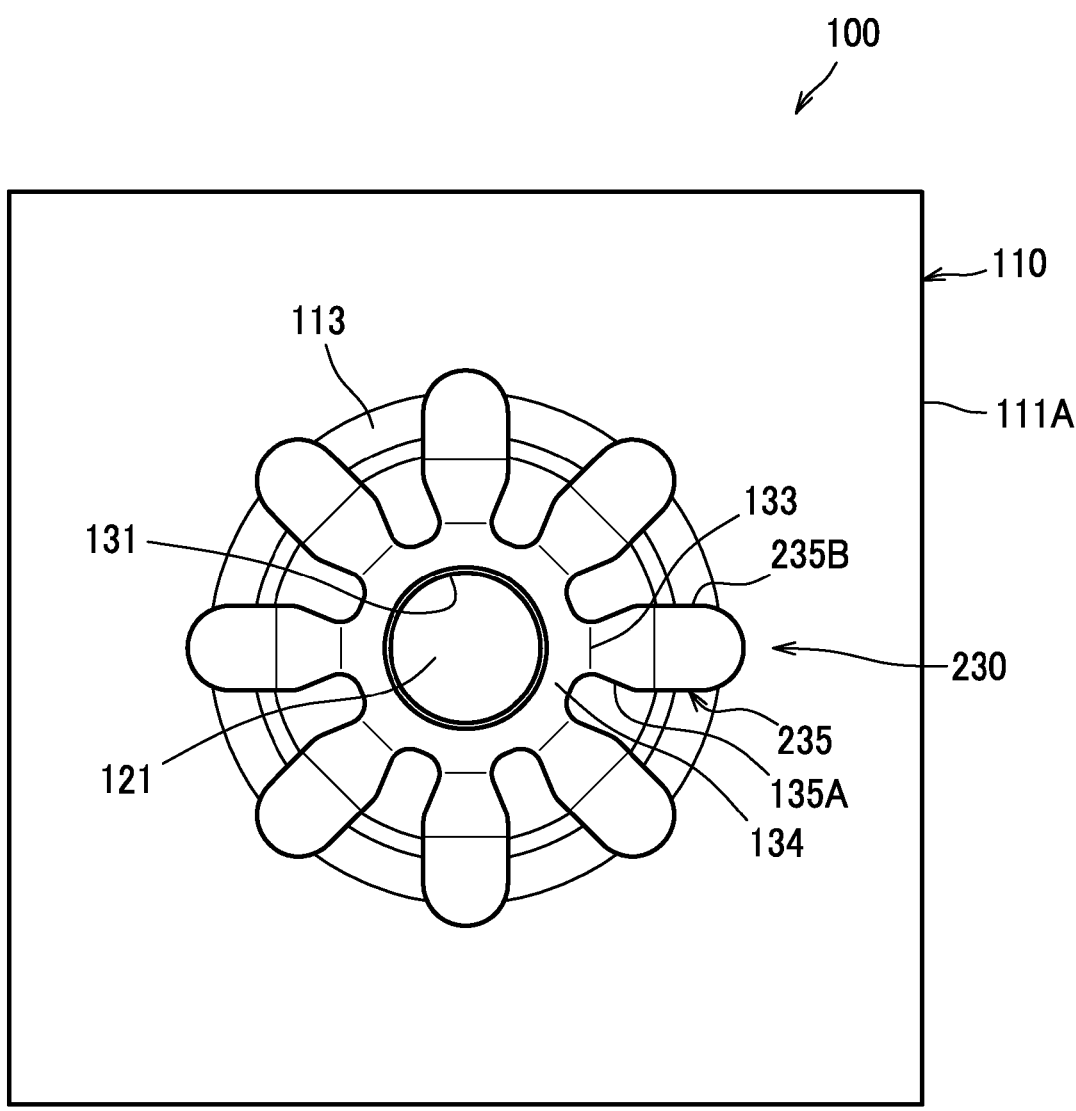
FIG. 6 is a plan view of the light deflector according to the modified example 1 as viewed from above.

The pressing portion 132 of the pressing member 130 is in contact with the upper surface of the third protrusion 113 in the above-described embodiment, but an alternative configuration may be implementable, for example, in which the third protrusion 113 has a corner 113C provided at a radially outer side thereof, and a pressing portion 232 of a pressing member 230 is in contact with this corner 113C of the third protrusion 113, as shown in FIG. 5. To be more specific, the pressing member 230 shown in FIG. 5 includes an engaging portion 131 and an annular flange portion 134 that are substantially similar in construction to the relevant parts in the above-described embodiment, as well as arm portions 235 that are structurally different from the arm portions 135 in the above-described embodiment. The engaging portion 131 of FIG. 5 is, unlike the relevant part in the above-described embodiment, arranged to protrude from the inner edge of the annular flange portion 134 upward.

Each arm portion 235 includes a constriction portion 135A that is substantially similar in construction to the relevant part in the above-described embodiment, and a distal end portion 235B that is structurally different from the relevant part in the above-described embodiment. The distal end portion 235B includes a first portion B21 and a second portion B22 as shown in FIG. 5 in which the pressing member 230 unstressed before attachment to the shaft 121 is represented by chain double-dashed lines. The first portion B21 extends from the outer end of the constriction portion 135A radially outward. The second portion B22 extends from an outer end of the first portion B21 obliquely in a radially-outward-and-downward direction.

Accordingly, a predetermined spot of the second portion B22 serves as the pressing portion 232 that is brought into contact with the corner 113C of the third protrusion 113 of the polygon mirror 110 to thereby press the corner 113C in a radially-inward-and-downward direction when the pressing member 230 is attached to the shaft 121. As seen in FIG. 5, in this modified configuration, the thickness of the third protrusion 113 in the radial direction is smaller than that the relevant part in the above-described embodiment and is substantially the same as the thickness of the second protrusion 112.

With this alternative configuration, since the third protrusion 113 is pressed in the radially inward direction, an undesirable radial shift (movement in the radial direction) of the polygon mirror 110 can be restricted. To be more specific, the polygon mirror 110 made of plastic has a thermal expansion coefficient greater than that of the rotor 122 made of metal, and therefore, weight imbalance would occur by decentering of the polygon mirror 110 and the rotor 122 due to thermal expansion; however, such weight imbalance can be suppressed by application of the pressing force toward radially inward direction to the polygon mirror 110. Accordingly, with this configuration, the polygon mirror 110 can be caused to rotate with stability.

Figure 7:
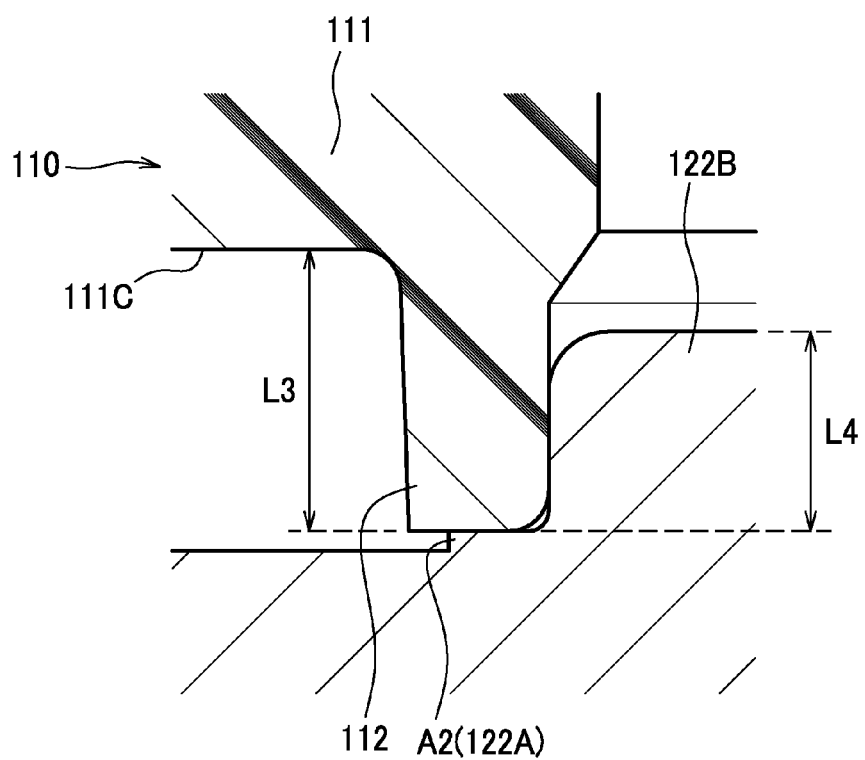
FIG. 7 is an enlarged sectional view showing a structure of a modified example 2 including a first protrusion of a rotor and a second protrusion of a polygon mirror.

Although the distance L1 from the lower surface 111C of the main body 111 of the polygon mirror 110 to the end face 112A of the second protrusion 112 is shorter than a distance L2 from the upper end of the projection A2 (base 122A) to the protruding end of the first protrusion 122B, an alternative configuration as shown in FIG. 7 may be implementable in which a distance L3 from the lower surface 111C (main body 111) of the polygon mirror 110 to the end face of the second protrusion 112 may be longer than a distance L4 from the projection A2 of the base 122A to the protruding end of the first protrusion 122B.

With this alternative configuration, direct transmission of heat from the first protrusion 122B to the main body 111 can be restricted, and thus the thermal deformation of the reflecting surfaces 111A can be restricted effectively.

In the above-described embodiment, the polygon mirror 110 is configured to have a shape of a quadrangular prism with substantially square bases; however, the polygon mirror may alternatively be configured to have a shape of any polygonal prism with pentagonal or hexagonal bases.

In the above-described embodiment, the second protrusion 112 is configured to have an annular shape; however, the second protrusion may alternatively be shaped, for example, like a letter C following an imaginary circle of which a center coincides with the axis of rotation, or formed in a rotation-symmetric configuration with respect to the axis of rotation (e.g., polygonal shape), or configured to include a plurality of protrusions arranged along an imaginary circle of which a center coincides with the axis of rotation.

In the above-described embodiment, the inside diameter of the inner face 112B of the second protrusion 112 is shown to be slightly larger than the outside diameter of the cylindrical first protrusion 122B; however, the annular second protrusion 112 may be fitted closely (or press-fitted) on the first protrusion 122B, instead. With this alternative configuration, a stress produced when the second protrusion 112 is fitted on the first protrusion 122B can be absorbed by deformation of the second protrusion 112, and thus the deformation of the reflecting surfaces 111A caused by such a stress can be suppressed.

In the above-described embodiment, the second protrusion 112 is designed such that part of its end face 112A is in contact with the base 122A; however, the entire end face of the second protrusion may be in contact with the base.

In the above description, a monochrome laser printer 1 is illustrated as an example of an image forming apparatus, but a color printer or a multifunction peripheral, or other type of image forming apparatus may be configured as described herein.

In the above description, a photoconductor drum 61 is illustrated as an example of a photoconductor, but a belt-type photoconductor may be adopted, instead.

What is claimed is:
1. A light deflector comprising:
   a polygon mirror made of plastic;
   a motor including a rotor and a shaft, the rotor supporting the polygon mirror, the shaft being coaxially rotatable together with the rotor; and
   a pressing member configured to press the polygon mirror against the rotor, the pressing member including an engaging portion and a pressing portion, the engaging portion being engaged with the shaft, and the pressing portion being in contact with the polygon mirror,
   wherein the rotor includes:
      a base; and
      a first protrusion protruding from the base toward the polygon mirror in an axial direction,
   wherein the polygon mirror includes:
      a main body having a plurality of reflecting surfaces and a through hole piercing therethrough in the axial direction, the shaft being disposed in the through hole, the main body having a first inside surface that defines the through hole, the first inside surface extending in the axial direction and separate from the shaft outwardly in the radial direction; and
      a second protrusion protruding from the main body toward the base, the second protrusion being provided around the through hole, the second protrusion having an end face and an inner face, the end face being in contact with the base in the axial direction, and the inner face being in contact with the first protrusion in a radial direction;

wherein a thickness of the second protrusion in the radial direction is smaller than a thickness of the main body in the axial direction, wherein the end face includes a contact region and a non-contact region, the contact region being in contact with the base, and the non-contact region being out of contact with the base, wherein a position of the engaging portion in the axial direction is closer to the rotor than a position of a pressing portion in the axial direction.

2. The light deflector according to claim 1, wherein the second protrusion is annular, and wherein the contact region is a radially inner annular area of the end face, and the non-contact region is a radially outer annular area of the end face.

3. The light deflector according to claim 1, wherein the shaft is disposed in the through hole, the main body having a first inside surface that defines the through hole, the first inside surface extending in the axial direction and being separate from the shaft outwardly in the radial direction.

4. The light deflector according to claim 3, wherein the polygon mirror further includes an annular rib protruding from the first inside surface inwardly in the radial direction, the annular rib having a second inside surface extending in the axial direction and separate from the shaft outwardly in the radial direction, such that when viewed from a direction perpendicular to the axial direction, the second inside surface of the rib overlaps the reflecting surfaces.

5. The light deflector according to claim 4, wherein the polygon mirror further includes a slope having an inclined surface that connects the second inside surface and the first inside surface.

6. The light deflector according to claim 1, wherein the pressing portion is located within a radial distance range in which the second protrusion is provided.

7. The light deflector according to claim 1, wherein the pressing member further includes an intermediate portion provided between the engaging portion and the pressing portion, the intermediate portion having a width narrower than that of the pressing portion.

8. The light deflector according to claim 1, wherein the polygon mirror further includes a third protrusion protruding from the main body toward the pressing member, the third protrusion being in contact with the pressing portion.

9. The light deflector according to claim 8, wherein the third protrusion has a corner provided at an outer side thereof in the radial direction, the pressing portion being in contact with the corner of the third protrusion.

10. The light deflector according to claim 1, wherein a distance from the main body to the end face of the second protrusion is longer than a distance from the base to a protruding end of the first protrusion.

11. A light deflector according to claim 1, wherein the polygon mirror includes:

a third protrusion protruding from the main body toward the pressing member, the third protrusion being in contact with the pressing portion, the third protrusion having a thickness in the radial direction greater than a thickness of the second protrusion in the radial direction and smaller than a thickness of the main body in the axial direction.

12. A light deflector comprising:

a polygon mirror made of plastic; and a motor including a rotor and a shaft, the rotor supporting the polygon mirror, the shaft being coaxially rotatable together with the rotor, wherein the rotor includes:

a base; and a first protrusion protruding from the base toward the polygon mirror in an axial direction, and wherein the polygon mirror includes:

a main body having a plurality of reflecting surfaces and a through hole piercing therethrough in the axial direction, the shaft being disposed in the through hole, the main body having a first inside surface that defines the through hole, the first inside surface extending in the axial direction and separate from the shaft outwardly in the radial direction;

a second protrusion protruding from the main body toward the base, the second protrusion having an end face and an inner face, the end face being in contact with the base in the axial direction, and the inner face being in contact with the first protrusion in a radial direction;

an annular rib protruding form the first inside surface inwardly in the radial direction, the annular rib having a second inside surface extending in the axial direction and separate from the shaft outwardly in the radial direction, such that when viewed from a direction perpendicular to the axial direction, the second inside surface of the rib overlaps the reflecting surfaces; and a slope having an inclined surface that connects the second inside surface and the first inside surface, and wherein an inside diameter of the inner face of the second protrusion is equal to an outside diameter of the first protrusion, and an inside diameter of the second inside surface of the annular rib is smaller than the outside diameter of the first protrusion.

13. The light deflector according to claim 12, wherein a thickness of the second protrusion in the radial direction is smaller than a thickness of the main body in the axial direction.

14. The light deflector according to claim 12, wherein the end face includes a contact region and a non-contact region, the contact region being in contact with the base, and the non-contact region being out of contact with the base.

15. The light deflector according to claim 12, wherein a distance from the main body to the end face of the second protrusion is longer than a distance from the base to a protruding end of the first protrusion.

16. The light deflector according to claim 12, wherein, when viewed from the direction perpendicular to the axial direction, the inner face, the first inside surface, the inclined surface and the second inside surface are arranged continuously in this order in a direction away from the rotor in comparison with an area closer to the rotor.

* * * * *